United States Patent [19]

Gori

[11] Patent Number: 5,301,443
[45] Date of Patent: Apr. 12, 1994

[54] SHOPING CART HANDLE ADVERTISING DISPLAY DEVICE

[76] Inventor: Leon M. Gori, 1206 Thomas St., Monongahela, Pa. 15063

[21] Appl. No.: 581,008

[22] Filed: Sep. 12, 1990

[51] Int. Cl.⁵ .............................. G09F 7/18; B62B 5/06
[52] U.S. Cl. ........................................ 40/308; 40/611; 403/312
[58] Field of Search ................. 40/308, 611, 607, 584, 40/333, 653, 506, 660, 658; 280/33.991, 33.992; 403/312, 311, 310, 13

[56] References Cited

U.S. PATENT DOCUMENTS

| | | | |
|---|---|---|---|
| D. 205,177 | 7/1966 | Drugan | 40/308 X |
| 218,882 | 8/1879 | Hopkins | 40/611 |
| 548,555 | 10/1895 | Joski | 40/506 |
| 772,634 | 10/1904 | Snyder | 403/344 |
| 2,372,387 | 3/1945 | Morin, Jr. et al. | 40/333 |
| 2,468,421 | 4/1949 | Williams | 40/607 |
| 2,507,875 | 5/1950 | Williams | 40/611 X |
| 2,625,762 | 1/1953 | McColl | 40/607 |
| 2,759,281 | 8/1956 | Akers | 40/653 |
| 2,918,741 | 12/1959 | Welter et al. | 40/308 |
| 4,291,475 | 9/1981 | Shoemer | 40/661 X |
| 4,422,348 | 12/1983 | Campbell | 403/344 X |
| 4,772,168 | 9/1988 | Ackeret | 40/511 X |
| 5,044,100 | 9/1991 | Roberts et al. | 40/158.1 |
| 5,085,535 | 2/1992 | Solberg et al. | 403/13 X |

FOREIGN PATENT DOCUMENTS

| | | | |
|---|---|---|---|
| 3528898 | 2/1987 | Fed. Rep. of Germany | 280/33.992 |
| 2208450 | 3/1989 | United Kingdom | 40/584 |

Primary Examiner—James R. Brittain
Assistant Examiner—Cassandra Hope
Attorney, Agent, or Firm—Walter J. Blenko, Jr.

[57] ABSTRACT

An advertisement display device for use on the handle of a shopping cart is provided. The device has a versatile display area on which a set of inner advertisement frames and one larger, outer advertisement frame are located. Advertisement sheets may be removably mounted in the frames. Fastening members are provided for clamping the multipiece device onto the handle of an existing shopping cart without disturbing the handle.

11 Claims, 4 Drawing Sheets

SHOPING CART HANDLE ADVERTISING DISPLAY DEVICE

My invention relates to an advertisement display device for a shopping cart handle which may be easily clamped on the handle of an existing shopping cart. The display device provides a display area on which advertisements can be mounted in such a manner that removal and replacement of the advertisements can be easily accomplished.

Advertisement display devices for use with shopping carts have been previously known. For example, a display tube mounted on a shaft which is then journaled on brackets on a shopping cart frame is disclosed in Calder U.S. Pat. No. 4,513,983. The Calder design includes a transparent advertising display tube which is rotatably mounted adjacent the shopping cart's handle. In order to change the advertisement on display, the Calder design requires partial disassembly of the device including unscrewing an end cap and removing the advertising material from the tube.

Drugan et al. U.S. Pat. No. 3,281,978 discloses a display holder for a shopping cart involving a star-shaped display device mounted within a tube which must be partially disassembled in order to change the advertising material.

A shopping cart handle cover is disclosed in Welter et al. U.S. Pat. No. 2,918,741. The handle cover is composed of a cylindrical body which may be colored to give the handle a colored effect. The handle cover also has a hollowed-out portion in which the store name may be permanently displayed. The displayed material is magnified by a transparent cover portion placed over the name.

LaChance U.S. Pat. Nos. 2,962,827, 3,270,454 and 3,348,326 disclose various handle constructions for shopping carts which include the store name as a permanent display on the handle.

I provide a device having a multipiece body which, preferably, has two shell-like members which are complementary in shape. The multipiece body includes, in the preferred embodiment, a first member which is a cover member that fits over the shopping cart handle. In the preferred embodiment, a second member which is a base member is received under the handle. The first and second members are then clampingly engaged to one another around the handle of the shopping cart. A fastening system is also provided which includes receiving bores formed in the cover member at each corner thereof. Corresponding openings are formed in the base member. A threaded screw is passed through each receiving bore in the cover member and into the corresponding opening in the base member. A locking nut may be screwed on to the end of the threaded screw to retain the screw in position. Alignment pins are also provided in the cover member which are received into openings in the base member to provide further securement of the cover member and base member in the desired relative position.

The device has a top surface which comprises a display area. The display area preferably has a set of frames in which advertisements are removably mounted. In a preferred embodiment, three square inner frames are provided for mounting three separate advertisements and a larger outer frame is also provided to accommodate one larger advertisement, if desired, in a particular application.

In one form of the invention, additional fasteners are disclosed which are driven through openings in the second member of the body directly into the shopping cart handle to provide additional securement of the device to the handle.

In the accompanying drawings, I have illustrated a present preferred embodiment of my invention in which.

Figure 1:
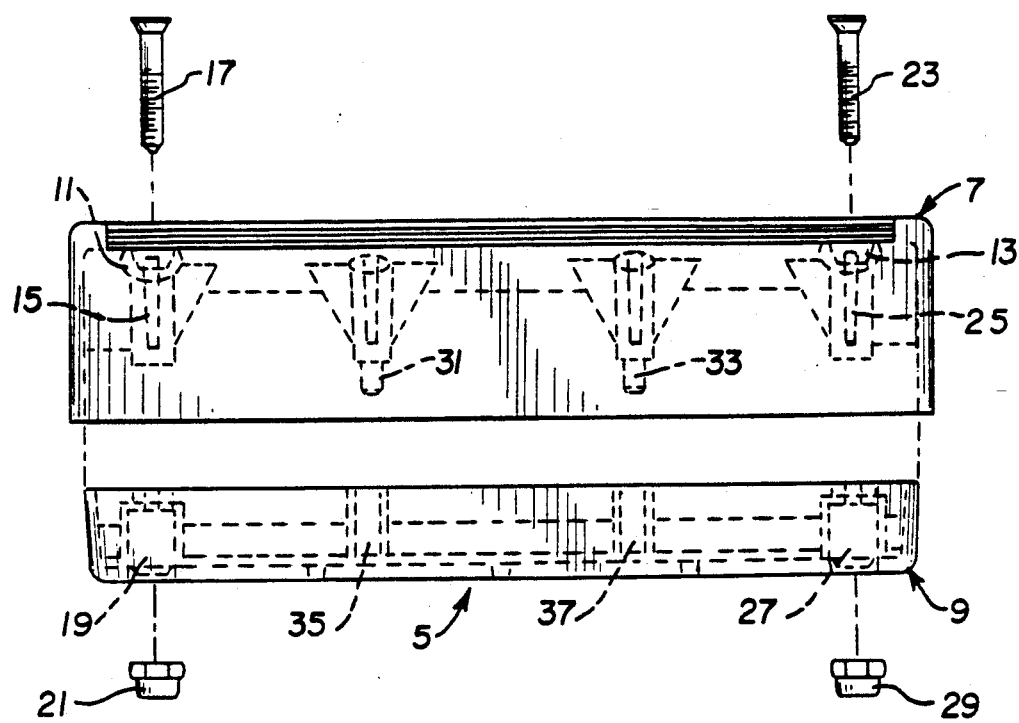
FIG. 1 is an exploded side elevation of the advertisement display device.

The display device is generally shown in FIG. 1. An advertisement display device 5 has a cover member 7 which is molded from a suitable plastic material. A base member 9 is shaped in a manner complementary to cover member 7, and it is also composed of a piece of molded plastic.

Cover member 7 has fastener receptacles 11 and 13. Two additional fastener receptacles (not shown in FIG. 1) are provided on an opposite side of device 5. Receptacle 11 is located generally adjacent one corner of cover member 7. Receptacle 13 is located generally adjacent an opposite corner. The fastener receptacles have internal receiving bores formed therein through which a fastener can be received. More specifically, fastener receptacle 11 has receiving bore 15 formed therein. A suitable fastener, such as screw 17, is passed through receiving bore 15 in receptacle 11. A corresponding opening 19 is formed in base member 9. Fastener 17 is passed through receiving bore 15 and into opening 19. A locking nut 21 is used to lock fastener 17 in place. Similarly, screw 23 passes through bore 25 in receptacle 13 and then through opening 27 in base member 9. A locking nut 29 is used to secure screw 23 in place to hold cover member 7 in a fixed position relative to base member 9, as discussed more fully herein.

Other types of fasteners may be used such as rivets, self-tapping screws and the like.

Cover member 7 is also provided with alignment studs 31 and 33 along one side of cover member 7 and a second set of alignment studs along an opposite side which are not visible in FIG. 1. Alignment studs 31 and 33 are received into corresponding tubular openings 35 and 37, respectively, in base member 9.

Figure 2:
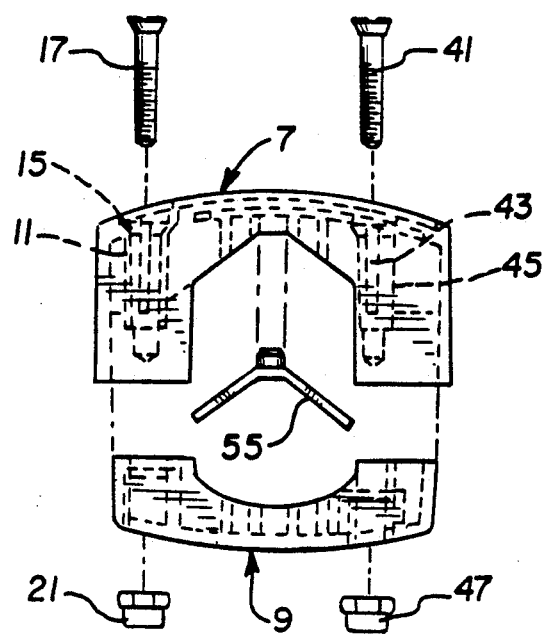
FIG. 2 is an exploded end elevation of the device of FIG. 1.
Figure 3:
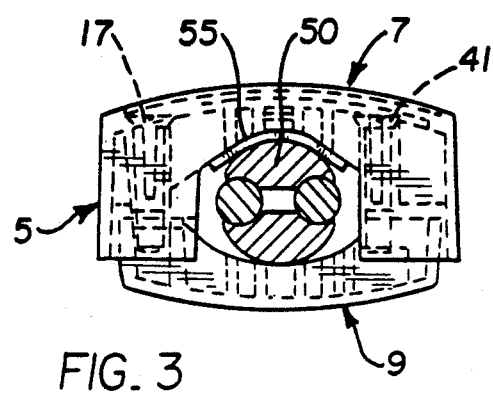
FIG. 3 is an end elevation of the device of FIG. 1 showing the device clamped on the handle of a shopping cart.

FIGS. 2 and 3 show end views of the display device further depicting the manner in which the device is clamped onto the handle of a shopping cart. Cover member 7 has screw 17 and interlocking nut 21 at one corner thereof. On an opposite side of cover member 7, another screw 41 is passed through receiving bore 43 of fastener receptacle 45 in cover member 7.

Locking nut 21 and locking nut 47 are used to secure screw 17 and screw 41, respectively, and thereby to hold cover member 7 in clamping engagement with base member 9. Cover member 7 and base member 9 are shown in assembled form in FIG. 3. Cover member 7 and base member 9 are held in clamping engagement around handle 50 by screws such as screw 17 and 41. The screws 17 and 41 straddle the handle 50. In order to resist any further movement of device 5 along handle 50, a spacer pad 55 is placed between handle 50 and cover member 7. The spacer pad 55 is composed of a suitable resilient material.

Figure 5:
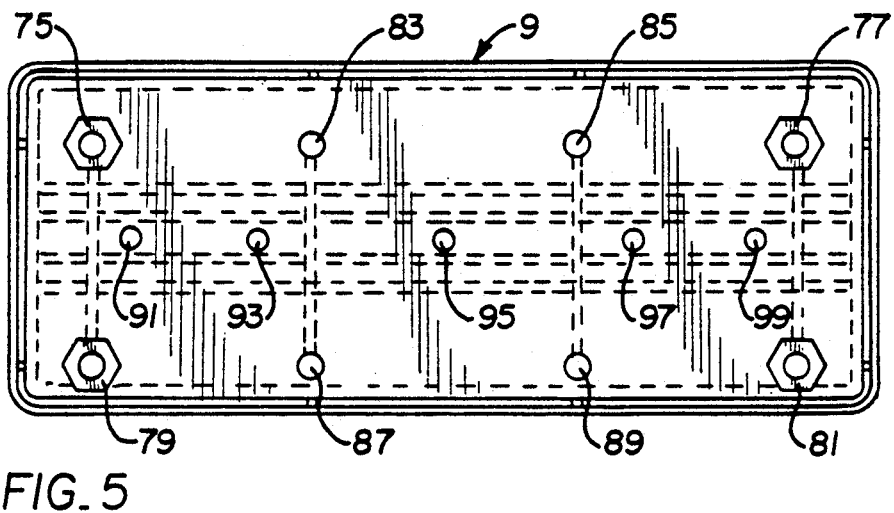
FIG. 5 is a bottom plan view of the second member of the device of FIG. 1.
Figure 4:
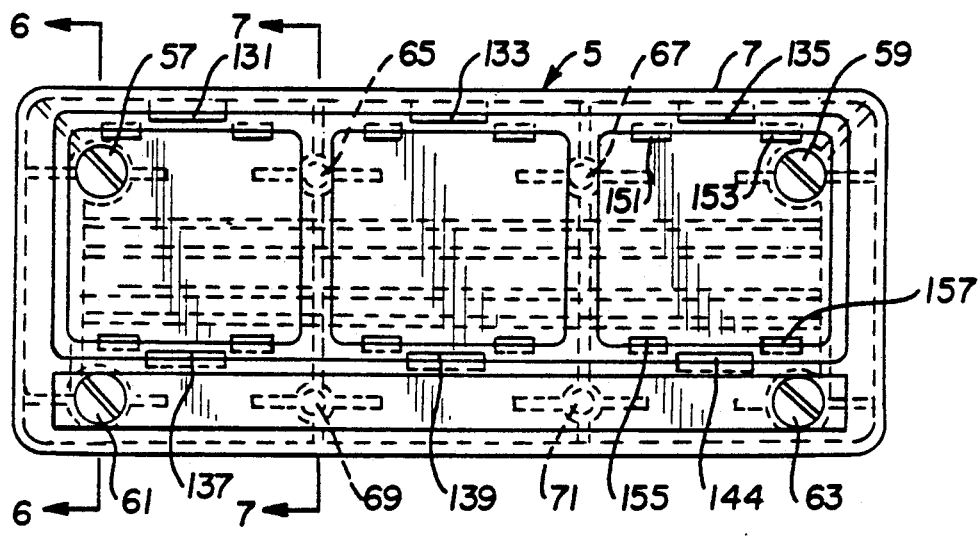
FIG. 4 is a top plan view of the first member of the body of FIG. 1 showing the interior of the first member in phantom.

Further details about the location of the fasteners and the receiving bores can be understood with reference to FIGS. 4 and 5. Referring to FIG. 4, fasteners 57, 59, 61 and 63 are located generally adjacent to the corners of display device 5. Pairs of fasteners straddle handle 50 (FIG. 3) to retain the cover member 7 and base member 5 in clamping engagement around handle 50. Cover member 7 also has alignment studs 65, 67, 69 and 71 which are received in corresponding openings in the base member.

Base member 9 (FIG. 5) has four hexagonally-shaped shelves 75, 77, 79 and 81 for supporting locking nuts such as nuts 21 and 47 of FIG. 2. The hexagonally-shaped shelves, such as shelf 75 (FIG. 5), are formed in the base member 9 and they surround the openings 83, 85, 87 and 89 through which the fastener such as screw 17 of FIGS. 1 and 2 is received. As described hereinbefore, tubular openings 83, 85, 87 and 89 are provided to receive alignment studs 65, 67, 69 and 71, respectively (FIG. 4).

I may further provide smaller openings 91 through 99 in base member 9 to receive additional fasteners such as roll pins (not shown). The roll pins are passed through openings 91 through 99 in base member 9 and are driven directly into the handle 50 (FIG. 3) to provide additional securement of the device onto the handle 50.

Figure 6:
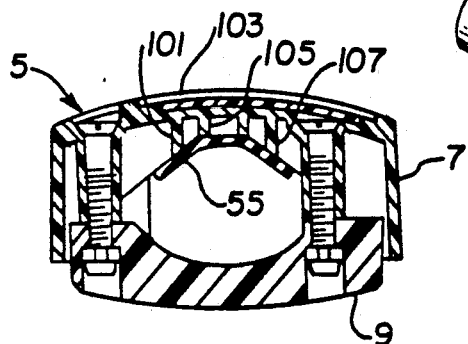
FIG. 6 is a cross-section of the display device taken along line 6—6 of FIG. 4.
Figure 7:
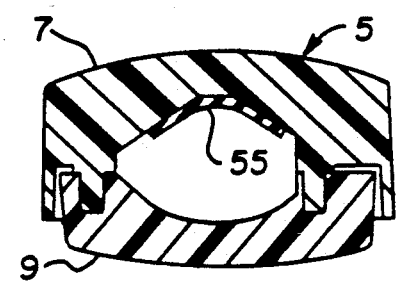
FIG. 7 is a cross-section of the display device taken along line 7—7 of FIG. 4.

As shown in FIGS. 6 and 7, cover member 7 and base member 9 fit together to clamp around a shopping cart handle. As shown more specifically in FIG. 7, cover member 7 may have ribbing such as ribbing 101 through 107 formed therein to support spacer pad 55 and to provide further tensioned engagement so that device 5 remains in a stationary position on handle 50 (FIG. 3).

Figure 8:
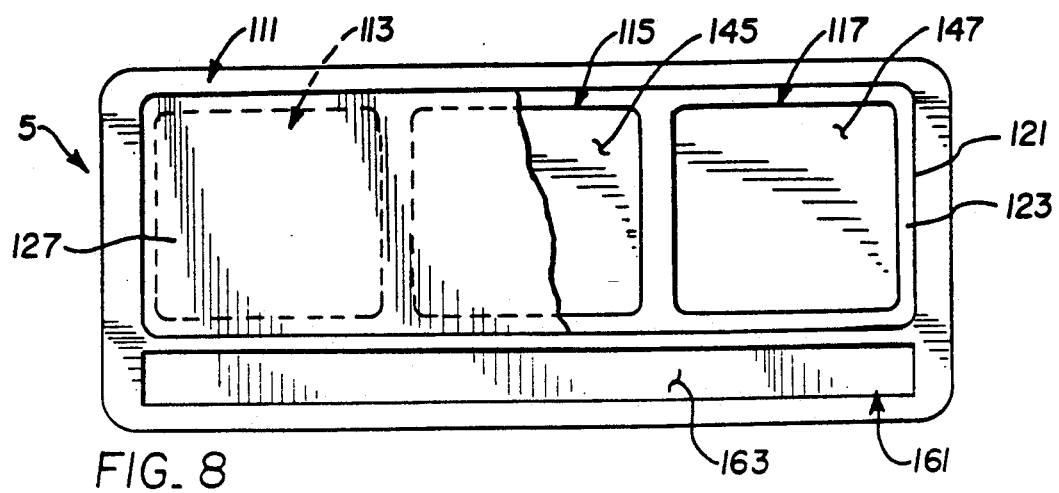
FIG. 8 is a top plan view of the device showing the inner frames and the outer frame of the display area and a portion of a large advertisement sheet in the outer frame and smaller advertisement sheets in the inner frames.
Figure 9:
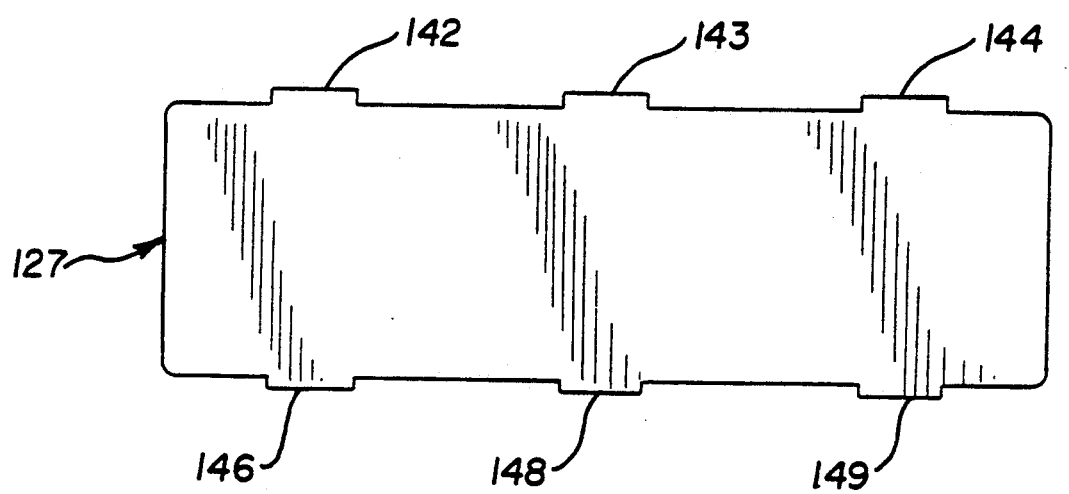
FIG. 9 is a top plan view of the larger advertisement sheet for use in the outer frame of the display device.

Device 5 has advertisement display area 111 (FIG. 8) on the top surface. Display area 111 preferably has three inner frames 113, 115 and 117. Frames 113, 115 and 117 are formed in the molded plastic cover member of device 5. In addition to inner frames 113, 115 and 117, the device 5 preferably includes outer frame 121, the perimeter of which encompasses all of the inner frames 113, 115 and 117. Inner frames 113, 115 and 117 are formed to a greater depth into the molded cover piece by about 1 millimeter than outer frame 121. This effectively creates a shelf 123 upon which advertisement sheet 127, which is preferably formed of acetate, can be supported. Advertisement sheet 127 is retained in place by slots 131 through 141 formed in cover member F (FIG. 4). As shown in FIG. 9, tabs 142, 143, 144, 146, 148 and 149 are formed in the advertisement sheet 127. The tabs are received into slots 131 through 141 and in this manner advertisement sheet 127 is removably mounted in outer frame 121.

In other applications, it may be desirable to provide three separate advertisements instead of one large sheet 127. In such a case, advertisement sheets may be mounted in inner frames 113, 115 and 117. For example, advertisement sheet 145 is removably mounted in frame 115 and advertisement sheet 147 is removably mounted in frame 117. The inner frames 113, 115 and 117 are also provided with slots, such as slots 151 through 157 shown in FIG. 4. The slots 151 through 157 received tabs (not shown) in an advertisement sheet 147 and the advertisement sheet 147 is removably mounted in inner frame 117, for example.

In addition to the frames, the display area 111 may also include an additional elongated frame 161 (FIG. 8) which can support a banner 163 which may bear the store name or any slogan as desired in the application. Banner 163 is preferably composed of a pressure sensitive material which may be adhered directly to the surface of device 5.

Figure 10:
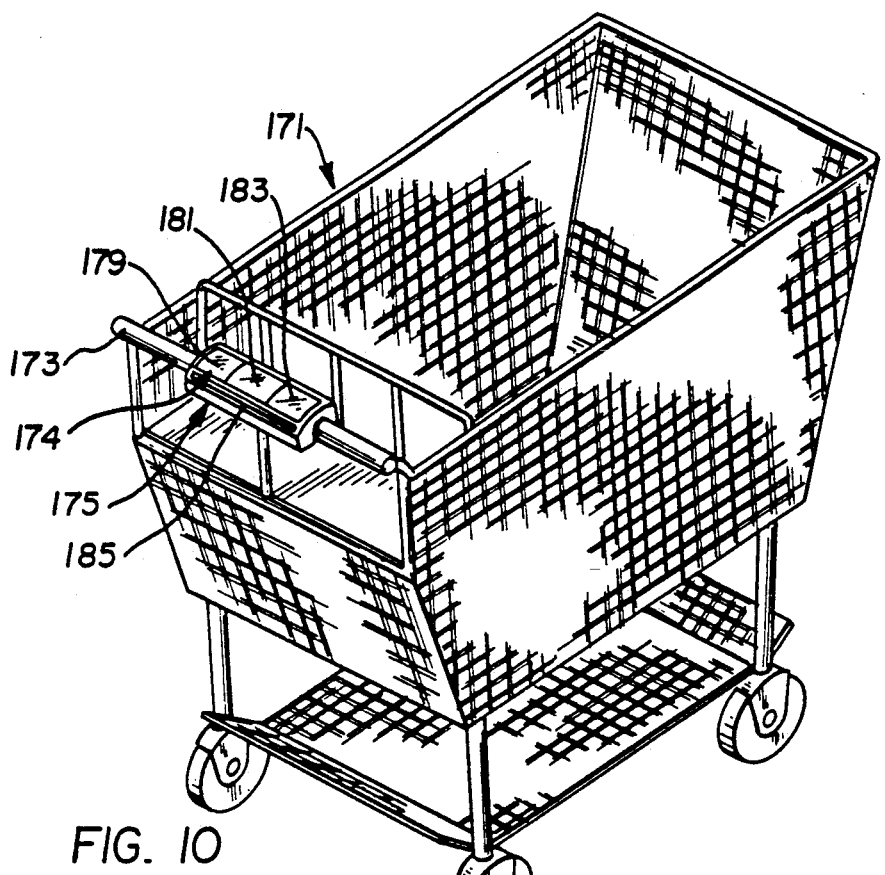
FIG. 10 is an isometric drawing of a typical shopping cart with the advertisement display device mounted on the handle of the cart.

The entire display device as assembled on the handle of a shopping cart is shown in FIG. 10. Shopping cart 171 has handle 173. A display device 175 is clamped on handle 173 in the manner described herein. Display area 177 of device 175 faces a user of the cart 171. Display area 177 may contain three separate advertisement sheets 179, 181 and 183 as well as a banner 185 bearing the store name. Advertisement sheets 179, 181 and 183 can be readily removed and replaced with new or alternative sheets. Alternatively, as described herein, one large sheet (not shown) could also be used with the device 175.

A versatile advertisement display device is provided which may be easily adopted to any shopping cart handle by simply clamping the two-piece body on the handle and inserting the advertisement sheets as desired. Advertisements can be changed regularly without disturbing the device or the shopping cart handle.

While we have illustrated and described a present preferred embodiment of the invention, it is to be understood that the invention is not limited thereto and may be otherwise variously practiced within the scope of the following claims.

I claim:

1. An advertisement display device in combination with a handle of a shopping cart, comprising:

a multipiece body portion comprising a first member and a second member, said members being complementary to one another and adapted to be engageable in clamping relationship to said handle of said shopping cart, and one of said members of said body portion having a top surface comprising a fixed area with a variable display, said area having at least one frame means formed therein for retaining a removably mountable advertisement sheet, said frame means comprising a plurality of generally rectangular inner frames, said frames each receiving a removably mountable advertisement sheet; and means for holding said first and second members of said multipiece body portion in clamping engagement around said handle.

2. The advertisement display device of claim 1 further comprising:

means for retaining said advertisement sheets in said frames being a plurality of opposed slots formed along edges of said frames, said slots being adapted to receive corresponding tabs formed in said advertisement sheets and each said advertisement sheet being removably mounted in one of said frames by said tabs being received in said slots to maintain each said advertisement sheet in position in an associated frame.

3. The advertisement display device of claim 2 further comprising:

said display area of said top surface of said first member also having an outer frame the perimeter of which encompasses all of said inner frames to form a generally rectangular shelf between said outer frame and said inner frames to support a single advertisement sheet sized to fit within said outer frame, said outer frame also having means for retaining said single advertisement sheet in said outer frame.

4. The advertisement display device of claim 3 further comprising:

said means for retaining a single advertisement sheet in said outer frame being a plurality of opposed slots formed along edges of said outer frame said slots being adapted to receive corresponding tabs formed in said single advertisement sheet and said advertisement sheet being removably mounted in said outer frame by said tabs being received in said slots in said outer frame.

5. An advertisement display device in combination with a handle of a shopping cart, comprising:

a multipiece body portion comprising a first member and a second member, said first and second members of said body portion being shell-like, complementary to one another, and engageable in clamping relationship to said handle of said shopping cert, and having complementary alignment means, said alignment means of said first member comprising pin means located within an interior portion of said first member spaced apart from one another such that said handle of said cart is received between said pin means, and said alignment means on said second member comprising slot means positioned to receive the pin means of said first member to maintain said first and second members in a fixed position relative to one another, and one of said members of said body portion having a top surface comprising a fixed area with a variable display, said area having at least one frame means formed therein for retaining a removably mountable advertisement sheet;

means for holding said first and second members of said multipiece body portion in clamping engagement around said handle; and a resilient spacer pad within said body portion adjacent said handle.

6. The advertisement display device of claim 5 wherein said spacer pad is fastened to said interior portion of said first member of said body portion adjacent to said handle.

7. The advertisement display device of claim 6 wherein said means for holding said multipiece body portion in engagement with said handle also comprises a plurality of second fastening means received in holes bored in said second member and said second fastening means being received through said holes in said first member and to clamp said first and second member in a fixed position relative to said handle.

8. An advertisement display device in combination with a handle of a shopping cart, comprising:

a first member which fits along said handle and a second member which is complementary to and fits within said first member in clamping engagement around said handle, said first member having at least one frame means disposed on a top surface of said first member in which an advertisement sheet member is removably mountable, said frame means of said first member comprising three rectangular inner frames formed in said first member, each said inner frame having a plurality of slots means therein for retaining an advertisement sheet member in each said inner frame, and said first member also having a rectangular outer frame formed around said inner frames, said outer frame having a plurality of slot means formed therein for retaining a single advertisement sheet member in said outer frame; and fastening means for securing said first member in clamping engagement around said handle.

9. The advertisement display device of claim 8 wherein said first member has four receiving bores formed therein, each said bore being located generally adjacent to a corner of said first member; and said second member has four openings therein each said opening corresponding to one of said bores in said first member.

10. The advertisement display device of claim 9 wherein said fastening means comprise threaded screws received into said receiving bores in said first member and through said openings in said second member to secure said first member and said second member in clamped engagement around said handle.

11. The advertisement display device of claim 10 wherein said fastening means also comprises a locking means received on one end of each said threaded screw.

* * * * *

UNITED STATES PATENT AND TRADEMARK OFFICE
CERTIFICATE OF CORRECTION

PATENT NO. : 5,301,443
DATED : April 12, 1994
INVENTOR(S) : Leon M. Gori

It is certified that error appears in the above-identified patent and that said Letters Patent is hereby corrected as shown below:

The title page, item [56], References Cited, please add the following:

```
--2,962,837  12/1960  LaChance et al.  40/308
  3,270,454   9/1966  LaChance         40/308
  3,281,978  11/1966  Drugan et al.    40/308
  3,348,326  10/1967  LaChance         40/308
  4,513,983   4/1985  Calder           280/33.99A--; in the
``` title of the patent, change "SHOPING" to --SHOPPING--.

Column 1, line 1, change "SHOPING" to --SHOPPING--.

Column 6, line 13, delete "and", first occurrence.

Signed and Sealed this

Fourth Day of October, 1994

Attest:

BRUCE LEHMAN

Attesting Officer

Commissioner of Patents and Trademarks